(12) United States Patent
Chen et al.

(10) Patent No.: US 11,846,525 B2
(45) Date of Patent: Dec. 19, 2023

(54) OPTICAL PROXIMITY SENSOR INTEGRATED INTO A CAMERA MODULE FOR AN ELECTRONIC DEVICE

(71) Applicant: Apple Inc., Cupertino, CA (US)

(72) Inventors: Tong Chen, Fremont, CA (US); Mehmet Mutlu, San Jose, CA (US); Mark T. Winkler, San Jose, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 17/476,913

(22) Filed: Sep. 16, 2021

(65) Prior Publication Data

US 2022/0003543 A1  Jan. 6, 2022

Related U.S. Application Data

(63) Continuation of application No. 16/418,875, filed on May 21, 2019, now Pat. No. 11,156,456.

(51) Int. Cl.
| | | |
|---|---|---|
| *G01C 3/08* | (2006.01) | |
| *G02B 5/20* | (2006.01) | |
| *G03B 11/00* | (2021.01) | |
| *G03B 13/20* | (2021.01) | |
| *G01S 17/08* | (2006.01) | |
| *G01S 7/481* | (2006.01) | |

(Continued)

(52) U.S. Cl.
CPC ............. *G01C 3/08* (2013.01); *G01S 7/4813* (2013.01); *G01S 17/04* (2020.01); *G01S 17/08* (2013.01); *G02B 5/208* (2013.01); *G02B 7/021* (2013.01); *G03B 11/00* (2013.01); *G03B 13/20* (2013.01)

(58) Field of Classification Search
CPC ......... G01C 3/08; G01S 7/4813; G01S 17/04; G01S 17/08; G01S 17/58; G01S 17/86; G01S 17/88; G02B 5/208; G02B 7/021; G02B 5/282; G02B 13/14; G02B 13/24; G03B 11/00; G03B 13/20; G03B 15/03; G03B 30/00; G03B 17/12

See application file for complete search history.

(56) References Cited

U.S. PATENT DOCUMENTS

| | | |
|---|---|---|
| 4,254,333 A | 3/1981 | Bergström |
| 4,468,131 A | 8/1984 | Bui et al. |

(Continued)

FOREIGN PATENT DOCUMENTS

| | | |
|---|---|---|
| CN | 101592762 | 12/2009 |
| CN | 102109650 | 6/2011 |

(Continued)

OTHER PUBLICATIONS

U.S. Appl. No. 17/167,218, filed Feb. 4, 2021, Shou et al.

(Continued)

*Primary Examiner* — Mohamed K Amara

(74) *Attorney, Agent, or Firm* — Brownstein Hyatt Farber Schreck, LLP

(57) ABSTRACT

An optical sensing system can be integrated into a camera module. In particular, an optical element of an optical sensing system can be disposed entirely or partly within a barrel of a camera module. The optical element can be oriented toward a reflective surface, such as an infrared cut filter, such that an optical path is defined between free space and the optical element via at least one reflection off the reflective surface.

20 Claims, 9 Drawing Sheets

(51) Int. Cl.
*G02B 7/02* (2021.01)
*G01S 17/04* (2020.01)

(56) References Cited

U.S. PATENT DOCUMENTS

| | | | |
|---|---|---|---|
| 4,913,547 A | 4/1990 | Moran | |
| 5,500,708 A * | 3/1996 | Ohsawa | G02B 7/28 |
| | | | 396/114 |
| 5,781,297 A | 7/1998 | Castore | |
| 5,825,465 A | 10/1998 | Nerin et al. | |
| 6,233,045 B1 | 5/2001 | Suni et al. | |
| 6,531,767 B2 | 3/2003 | Shrauger | |
| 6,816,523 B1 | 11/2004 | Glenn et al. | |
| 6,872,931 B2 | 3/2005 | Liess et al. | |
| 7,139,446 B2 | 11/2006 | Slotwinski | |
| 7,184,445 B2 | 2/2007 | Guenter | |
| 7,277,180 B2 | 10/2007 | Townley-Smith et al. | |
| 7,336,368 B2 | 2/2008 | Liao et al. | |
| 7,366,217 B2 | 4/2008 | Guenter et al. | |
| 7,388,672 B2 | 6/2008 | Zhou et al. | |
| 7,509,050 B2 | 3/2009 | Ekkizogloy et al. | |
| 7,557,795 B2 | 7/2009 | Kong et al. | |
| 7,589,709 B2 | 9/2009 | Liess et al. | |
| 7,620,332 B2 | 11/2009 | Nishiyama | |
| 7,667,851 B2 | 2/2010 | Dubois et al. | |
| 7,675,020 B2 | 3/2010 | Machida | |
| 7,684,957 B2 | 3/2010 | Ueno | |
| 7,995,193 B2 | 8/2011 | Kuwata | |
| 8,174,597 B2 | 5/2012 | Ogasawara | |
| 8,208,814 B2 | 6/2012 | Sheth et al. | |
| 8,248,615 B2 | 8/2012 | Ueno | |
| 8,378,287 B2 | 2/2013 | Schemmann et al. | |
| 8,416,424 B2 | 4/2013 | Werner et al. | |
| 8,446,592 B1 | 5/2013 | Arissian | |
| 8,529,460 B2 | 9/2013 | Kawano et al. | |
| 8,736,581 B2 | 5/2014 | Han et al. | |
| 8,751,091 B2 | 6/2014 | Moench et al. | |
| 8,781,687 B2 | 7/2014 | Han et al. | |
| 8,896,745 B2 | 11/2014 | Takachi | |
| 8,942,069 B2 | 1/2015 | Tortora | |
| 9,004,698 B2 | 4/2015 | Kilcher et al. | |
| 9,091,573 B2 | 7/2015 | Van Der Lee et al. | |
| 9,091,747 B2 | 7/2015 | Pruijmboom | |
| 9,146,304 B2 | 9/2015 | Land et al. | |
| 9,160,390 B2 | 10/2015 | Zhou et al. | |
| 9,420,155 B2 * | 8/2016 | Brodie | H04N 23/57 |
| 9,459,352 B2 | 10/2016 | Becker et al. | |
| 9,648,221 B2 | 5/2017 | Seo et al. | |
| 9,658,113 B2 | 5/2017 | Bosch et al. | |
| 9,677,986 B1 * | 6/2017 | Baldwin | G01S 7/481 |
| 9,703,173 B2 * | 7/2017 | Brodie | G03B 3/10 |
| 9,726,474 B2 | 8/2017 | Royo Royo et al. | |
| 9,772,398 B2 | 9/2017 | Bikumandla et al. | |
| 9,778,037 B2 * | 10/2017 | Bestler | G01C 15/008 |
| 9,911,890 B2 | 3/2018 | Renard et al. | |
| 9,912,923 B2 | 3/2018 | Kilcher et al. | |
| 9,952,245 B2 | 4/2018 | Ueno | |
| 9,995,877 B2 | 6/2018 | Nakamura | |
| RE46,930 E * | 7/2018 | Mimeault | G01S 7/4865 |
| 10,184,783 B2 | 1/2019 | Flanders et al. | |
| 10,215,555 B2 | 2/2019 | Chen et al. | |
| 10,222,474 B1 | 3/2019 | Raring et al. | |
| 10,317,651 B2 | 6/2019 | Furutake et al. | |
| 10,379,028 B2 | 8/2019 | Spruit et al. | |
| 10,386,554 B2 | 8/2019 | Hjelmstrom et al. | |
| 10,492,679 B2 | 12/2019 | Zhou | |
| 10,503,048 B2 | 12/2019 | Del Bino et al. | |
| 10,555,079 B2 | 2/2020 | Bakish | |
| 10,613,625 B2 | 4/2020 | Huang et al. | |
| 10,614,295 B2 | 4/2020 | Kim et al. | |
| 10,635,800 B2 | 4/2020 | Bakish | |
| 10,581,474 B1 | 6/2020 | Fishman et al. | |
| 10,705,211 B2 | 7/2020 | Jacobs et al. | |
| 10,718,922 B2 | 7/2020 | Yong et al. | |
| 10,791,283 B2 | 9/2020 | Bardagjy et al. | |
| 10,824,275 B2 | 11/2020 | Mutlu et al. | |
| 10,845,873 B2 | 11/2020 | Huang | |
| 10,866,083 B2 | 12/2020 | Van Der Lee et al. | |
| 10,871,820 B2 | 12/2020 | Mutlu et al. | |
| 10,871,836 B2 | 12/2020 | Dashevsky | |
| 10,970,556 B2 | 4/2021 | Teich et al. | |
| 11,073,615 B2 | 7/2021 | Chua et al. | |
| 11,112,233 B2 | 9/2021 | Mutlu et al. | |
| 11,150,332 B1 | 10/2021 | Chen et al. | |
| 11,157,113 B2 | 10/2021 | Winkler et al. | |
| 11,175,700 B1 * | 11/2021 | Poole | G06F 1/1684 |
| 11,243,068 B1 | 2/2022 | Mutlu et al. | |
| 11,243,686 B2 | 2/2022 | McCord | |
| 11,280,714 B2 | 3/2022 | Momtahan et al. | |
| 11,494,926 B1 * | 11/2022 | Wu | G01S 17/89 |
| 2005/0156874 A1 | 7/2005 | Kong | |
| 2005/0157971 A1 | 7/2005 | Juijve | |
| 2006/0239312 A1 | 10/2006 | Kewitsch et al. | |
| 2008/0123106 A1 | 5/2008 | Zeng et al. | |
| 2009/0002829 A1 | 1/2009 | Shinohara | |
| 2009/0168154 A1 * | 7/2009 | Irie | G03B 17/02 |
| | | | 359/359 |
| 2011/0126617 A1 | 6/2011 | Bengoechea Apezteguia et al. | |
| 2011/0267467 A1 | 11/2011 | Kimura et al. | |
| 2012/0057858 A1 * | 3/2012 | Kobayashi | G03B 17/12 |
| | | | 396/439 |
| 2012/0281221 A1 | 11/2012 | Studer et al. | |
| 2014/0293055 A1 | 10/2014 | Otsuka | |
| 2015/0309568 A1 | 10/2015 | Miki | |
| 2015/0355711 A1 * | 12/2015 | Rihn | G06F 3/04815 |
| | | | 340/407.2 |
| 2016/0021285 A1 | 1/2016 | Nadler et al. | |
| 2017/0090599 A1 | 3/2017 | Kuboyama et al. | |
| 2017/0192133 A1 | 7/2017 | Murakami et al. | |
| 2017/0343817 A1 | 11/2017 | Bietry et al. | |
| 2018/0073924 A1 | 3/2018 | Steinmann et al. | |
| 2018/0081434 A1 | 3/2018 | Siddiqui et al. | |
| 2018/0153430 A1 * | 6/2018 | Ang | A61B 5/7203 |
| 2019/0146065 A1 | 5/2019 | Jutte et al. | |
| 2019/0310490 A1 * | 10/2019 | Park | G03B 17/12 |
| 2019/0317454 A1 | 10/2019 | Holenarsipur et al. | |
| 2019/0319157 A1 | 10/2019 | Coffy et al. | |
| 2019/0391539 A1 | 12/2019 | Perkins et al. | |
| 2020/0072740 A1 | 3/2020 | Venturini et al. | |
| 2020/0103274 A1 | 4/2020 | Garrett et al. | |
| 2020/0200522 A1 | 6/2020 | Huang et al. | |
| 2020/0309661 A1 | 10/2020 | Spruit et al. | |
| 2020/0370879 A1 | 11/2020 | Mutlu et al. | |
| 2021/0003385 A1 | 1/2021 | Tan et al. | |
| 2021/0011559 A1 | 1/2021 | Mutlu et al. | |
| 2021/0015350 A1 | 1/2021 | Butte et al. | |
| 2021/0104873 A1 | 4/2021 | Gerlach | |
| 2021/0116355 A1 | 4/2021 | Spruit et al. | |
| 2021/0294489 A1 | 9/2021 | Li et al. | |
| 2022/0099436 A1 | 3/2022 | Chen et al. | |
| 2022/0155052 A1 | 5/2022 | Mutlu et al. | |
| 2022/0202515 A1 * | 6/2022 | Itkowitz | G06F 3/0346 |
| 2022/0244041 A1 | 8/2022 | Chen et al. | |
| 2022/0404138 A1 | 12/2022 | Mutlu et al. | |
| 2023/0087691 A1 | 3/2023 | Chen et al. | |

FOREIGN PATENT DOCUMENTS

| | | |
|---|---|---|
| CN | 105223579 | 1/2016 |
| CN | 107564924 | 1/2018 |
| CN | 108225543 | 6/2018 |
| CN | 108692663 | 4/2020 |
| EP | 3796140 | 3/2021 |
| GB | 2443662 | 5/2008 |
| JP | 2005528682 | 9/2005 |
| JP | 2010526315 | 7/2010 |
| JP | 2011523700 | 8/2011 |
| JP | 2013508717 | 3/2013 |
| JP | 2019515258 | 6/2019 |
| JP | 2019121691 | 7/2019 |
| WO | WO 05/013517 | 2/2005 |
| WO | WO 09/156937 | 12/2009 |
| WO | WO 10/139144 | 12/2010 |
| WO | WO 12/049561 | 4/2012 |

(56) References Cited

FOREIGN PATENT DOCUMENTS

| WO | WO 17/178711 | 10/2017 |
|----|--------------|---------|
| WO | WO 18/036685 | 3/2018  |
| WO | WO 19/015623 | 1/2019  |
| WO | WO 19/042953 | 3/2019  |

OTHER PUBLICATIONS

U.S. Appl. No. 17/710,682, filed Mar. 31, 2022, Chen et al.
U.S. Appl. No. 11/156,456, filed Oct. 2021, Chen et al.
Diao et al., "High-speed high-resolution heterodyne interferometer using a laser with low beat frequency," *Applied Optics*, vol. 55, No. 1, 2015, pp. 110-116.
U.S. Appl. No. 18/195,867, filed May 10, 2023, Chen et al.
U.S. Appl. No. 18/202,813, filed May 26, 2023, Jin et al.

\* cited by examiner

OPTICAL PROXIMITY SENSOR INTEGRATED INTO A CAMERA MODULE FOR AN ELECTRONIC DEVICE

CROSS-REFERENCE TO RELATED APPLICATION

This application is a continuation of U.S. patent application Ser. No. 16/418,875, filed May 21, 2019, the contents of which are incorporated herein by reference as if fully disclosed herein.

FIELD

Embodiments described herein relate to optical sensing, and, in particular, to systems and methods for integrating an optical sensing system, such as an optical interferometry proximity sensor, into a camera module configured for use with a portable or stationary electronic device.

BACKGROUND

An electronic device can include a housing that defines an optical path through a surface of the housing (e.g., an "imaging window") to facilitate optical sensing or imaging. For example, an electronic device can include a proximity sensor to sense proximity of an object or surface to the electronic device or estimate a distance separating the electronic device from the object or surface, such as a user of that electronic device. In other examples, the electronic device can include a camera for image or video capture.

Conventionally, however, an electronic device housing is required to define a separate and discrete imaging window for each optical sensing system of an electronic device, which can increase complexity and cost of manufacturing and may introduce an unappealing appearance to the electronic device housing.

SUMMARY

Embodiments described herein generally relate to a camera module for an electronic device. The camera module includes an enclosure defining a barrel. A lens group is disposed within the barrel. A spectral filter, such as an infrared cut filter or a color filter, is disposed within the enclosure and is positioned below the lens group above or interfacing an imaging sensor. The imaging sensor is disposed within the enclosure and is positioned below the spectral filter. In addition, the camera module includes a light-emitting element positioned within the barrel and configured to emit light in a spectral range that is reflected from the spectral filter along an optical path that reflects from the spectral filter and exits the enclosure.

Some embodiments described herein generally relate to a method of optical sensing with a light-emitting element disposed within a camera module of an electronic device. The method includes the operations of: emitting, from the light-emitting element, light toward a reflective surface within a body of the camera module traversing a first optical path that reflects from the reflective surface, traverses one or more camera imaging optics, and exits the camera module and receiving, at the light-emitting element, a reflection of the emitted light from an external surface of an object that interrupts the first optical path. In these example embodiments, the received reflection of the emitted light introduces a self-mixing interference effect to the light-emitting element.

Other embodiments described herein reference a camera module for an electronic device. The camera module includes an enclosure, camera imaging optics, a spectral filter, and an imaging sensor. In addition, the camera module includes an optical proximity sensor with a vertical cavity surface-emitting laser disposed onto an internal surface of the enclosure above the spectral filter and oriented to emit laser light toward the spectral filter such that the emitted laser light reflects from the spectral filter and exits the enclosure to propagate into free space. The optical proximity sensor of the camera module also includes a photodiode optically coupled to the vertical cavity surface-emitting laser and configured to monitor an output of the vertical cavity surface-emitting laser.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
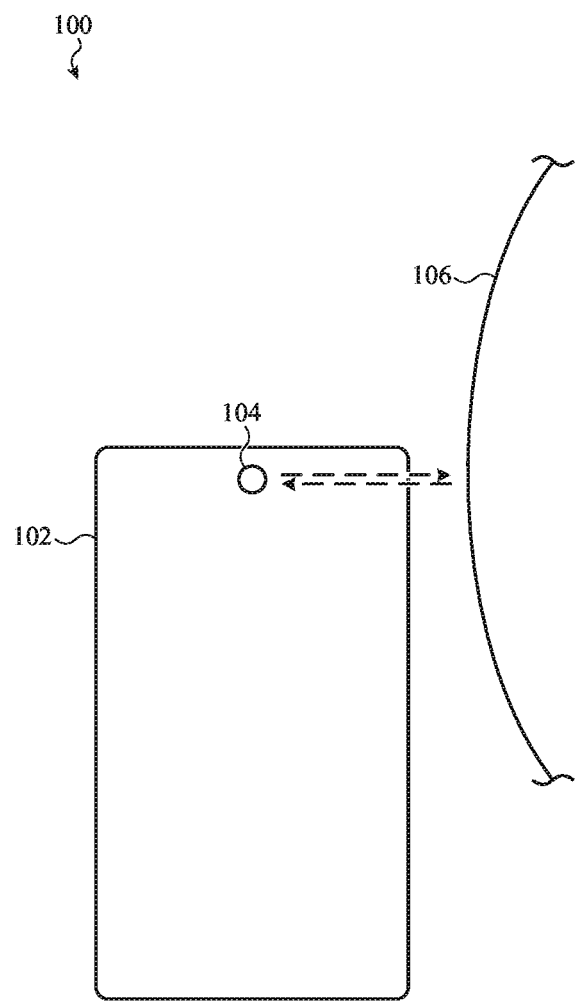
FIG. 1 depicts a schematic representation of an electronic device incorporating an optical sensing system, such as described herein, to determine a distance to, and/or a velocity of, an object nearby the electronic device.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by one or more photons originating from one or more light sources shown or, or in some cases, omitted from, the accompanying figures. It is understood that these simplified visual representations of light are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an optical sensing system integrated into a camera module of an electronic device. For example, the optical sensing system can be disposed in whole or in part on (or optically coupled to) an internal sidewall of a lens barrel of the camera module. The electronic device can be any portable or stationary electronic device that incorporates a camera module. Examples include cellular phones, tablet computers, wearable devices, laptop computing devices, and desktop computing devices. It is appreciated that this listing is not exhaustive and that any electronic device can incorporate one or more camera modules—for any suitable image capture purpose—such as described herein. In some embodiments, the camera module is a compact camera module suitable for a thin form-factor portable electronic device, although this is not required of all embodiments and any suitable camera module, lens assembly, or combination thereof can incorporate an optical sensing system such as described herein.

In many embodiments, an optical sensing system such as described herein is configured to utilize one or more reflective surfaces within the camera module itself to define one or more optical paths for the system to receive light incident to the camera module and, additionally or alternatively, for light radiated from the optical sensing system to exit the camera module and propagate into free space.

In many embodiments, although not required, the optical sensing system is configured to receive and/or emit light in a spectral range that is out of band with respect to a spectral range of an imaging sensor of the camera module. For example, the optical sensing system can be configured to operate in the infrared band(s) of light, whereas the imaging sensor of the camera module can be configured to operate in the visible band(s) of light. In this manner, and as a result of these described constructions, an imaging sensor of a camera module can capture visible-light images while simultaneously an optical imaging system integrated into the same camera module can emit and/or receive infrared light.

For example, in one construction, a camera module includes a lens barrel positioned over, and aligned with, an imaging sensor. The lens barrel supports and encloses one or more lens groups (and/or other optical elements) configured to cooperate to focus light in a field of view of the camera module onto the imaging sensor. In this example, a light-sensitive element of an optical sensing system can be disposed onto an interior sidewall surface of the barrel, in a region between lenses or lens groups. The light-sensitive element can be oriented to face the imaging sensor such that at least a portion of light that may be reflected by the imaging sensor (i.e., light not absorbed by the imaging sensor) can be received by the light-sensitive element.

In another related construction, a camera module includes a barrel positioned over, and aligned with, an imaging sensor. In this example, a light-emitting element of an optical sensing system can be disposed onto an interior sidewall surface of the barrel, in a region between lenses or lens groups. As with the light-sensitive element of the preceding example, the light-emitting element can be oriented to face the imaging sensor such that at least a portion of light emitted from the light-emitting element may be reflected by the imaging sensor (i.e., not absorbed by the imaging sensor), and thereafter, traverse through the various lens groups disposed in the barrel to exit the camera module and propagate into free space.

In one more particular example, a camera module can include an infrared cut filter specifically configured to reflect infrared light away from a visible light imaging sensor disposed below, and aligned with, a barrel of that camera module. In such examples, an optical sensing system—such as described herein—can be coupled to an inter-lens interior sidewall region of the barrel and oriented toward the infrared cut filter and imaging sensor. As a result of this construction, the optical sensing system is configured to collect and/or emit infrared light reflected at least once off the infrared cut filter. In other words, an infrared optical path (that can be used to emit and/or receive infrared light) is defined between the optical sensing system, the infrared cut filter, and free space external to the camera module.

In other examples, a camera module can include a color filter specifically configured to reflect a particular color or range of colors. In such examples, an optical sensing system—such as described herein—can be configured to collect and/or emit light reflected at least once from the color filter. Additional example reflective or partially reflective surfaces that can be leveraged by an optical sensing system integrated into a camera module can include, but are not limited to: polarization filters; reflective shutters; reflex prisms or mirrors; beam splitters; voice coils; imaging sensors; ultraviolet filters; lenses; and so on. It may be appreciated that any suitable reflective or partially reflective surface and/or combination of reflective or partially reflective surfaces may be leveraged by an optical sensing system, such as described herein.

Similarly, it may be appreciated that in many embodiments one or more reflective surfaces at least partially defining an optical path between an optical sensing system and free space external to a camera module incorporating that system may be planar or non-planar. In other words, reflective surfaces within a camera module may be convex, concave, and/or diffusive/diffractive reflectors.

In addition, in many embodiments, a focal point of the optical sensing system may be configured to be different than a focal point of the imaging sensor as defined by lens design and/or by actuation of one or more movable lens elements of a lens group of the camera module.

Further, it may be appreciated that any suitable optical imaging system can utilize the techniques and architectures described herein to receive and/or emit light. Examples include, but are not limited to: light meters; light color sensors; proximity sensors; dot projectors; motion/touch sensors; environmental sensors; health sensors; rangefinders; infrared image capture systems; ultraviolet image capture systems; and so on. It is appreciated that these examples are not exhaustive.

Accordingly, for simplicity of description, many embodiments that follow reference an "optical proximity sensor" as one example of an optical sensing system, such as described herein. It may be appreciated, however, that this is merely one example and that other optical sensing systems, system types, and combinations thereof, may be suitably incorporated into a camera module such as described herein. In particular, it may be appreciated that in certain embodiments more than one optical sensing system of the same or different type or configuration can be incorporated into a camera module such as described herein.

For example, in some embodiments, an optical proximity sensor can be integrated into a camera module that is disposed within a housing of a portable electronic device. The camera module is aligned with imaging optics disposed (or otherwise defined) entirely or partially in, or through, the housing. In this manner, the optical proximity sensor and the camera module can both use the same imaging optics, thereby improving and/or simplifying an aesthetic appearance of the housing while also reducing manufacturing complexity by requiring fewer apertures through a housing to accommodate multiple imaging optics.

The optical proximity sensor can include a vertical cavity surface-emitting laser ("VCSEL") disposed within a lens barrel of the camera module. In these embodiments, the VCSEL of the optical proximity sensor is oriented and configured to radiate a beam of infrared light ("infrared laser light") toward a spectral filter, such as an infrared cut filter, positioned over an imaging sensor of the camera module.

The infrared laser light is emitted from the VCSEL at an incidence angle such that it reflects from the infrared cut filter, traverses one or more lens elements within the barrel, and exits the camera module (and the electronic device housing) to propagate into free space. The infrared laser light may be coherent or may have a wavelength and/or a phase modulated according to a particular pattern.

The propagation through free space of the emitted infrared laser light may, on occasion, be interrupted by an object nearby the electronic device. If an object is present to interrupt the propagation of the infrared laser light, at least a portion of that laser light may be reflected from an external surface of that object back toward the lens barrel of the camera module. Thereafter, at least a portion of the reflected infrared laser light reenters the barrel of the camera module, traverses the one or more lenses in the barrel, reflects from the infrared cut filter, and returns to the VCSEL from which it was emitted, inducing a self-mixing interference effect.

As may be appreciated, one or more characteristics of a self-mixing interference effect experienced by the VCSEL (e.g., counts of interference mode hops, a quantified property of an observed beat frequency, and so on) can be correlated to a measurement of distance separating the object and the electronic device. This distance is referred to herein as the "measured distance" (or, more generally, a "measured quantity" which may include velocity and/or acceleration information in addition to distance information) and it is understood to refer to an estimation or approximation of a straight-line distance separating an electronic device and the nearest external surface of a nearby object.

Once a measured distance to an object is determined, the optical proximity sensor can electronically communicate a digital or analog representation thereof—and, optionally, a velocity or acceleration of the object relative to the electronic device (e.g., a change in distance over time observed by the optical proximity sensor)—to a processor or circuit of the electronic device incorporating the optical proximity sensor.

The electronic device can utilize information received from the optical proximity sensor to perform any suitable task or operation or sets thereof. Examples include, but are not limited to: disabling or reducing a brightness of a display of the electronic device in response to receiving information from the optical proximity sensor that an object is closer than a threshold distance to the electronic device; enabling or increasing a brightness of a display of the electronic device in response to receiving information from the optical proximity sensor that an object is farther than a threshold distance to the electronic device; enabling or disabling a touch or force input system of the electronic device in response to receiving information from the optical proximity sensor that an object is nearby (e.g., a distance satisfying a threshold or within a threshold range) the electronic device; provide target ranging; detecting camera occlusion; consume low-latency and/or real-time imaging, ranging, field of view, or video information or data; and so on.

As a result of these described and other equivalent constructions, an electronic device incorporating an optical proximity sensor, such as described herein, can simultaneously perform operations related to infrared proximity sensing and operations related to image or video capture through a single, shared, imaging window.

For simplicity of description, example optical proximity sensor embodiments described herein include a single VCSEL configured to emit infrared light in a spectral range and at an incident angle that is reflected by an infrared cut filter disposed over a visible light imaging sensor of a camera module. However, it may be appreciated that this is merely one example and that in other embodiments, more than one VCSEL can be used (e.g., an array of VCSELs disposed in any suitable pattern and/or configured to emit light in any suitable pattern) or, additionally or alternatively, a VCSEL configured to emit light in a spectral range including a traditionally visible frequency band can be used. Further, although not required for all embodiments, the example VCSEL described in reference to embodiments that follow is understood to be a Class 1 laser as defined by the American National Standards Institute; in other cases, higher power lasers may be used.

As noted above, a velocity and/or an acceleration of an object can be additionally determined by an optical proximity sensor by monitoring for changes in the measured distance over time (e.g., at regular intervals) and/or by monitoring for, or simulating, Doppler effects (e.g., changes in frequency or color of light received by the system). For example, in one embodiment, wavelength modulation may be used to simultaneously detect distance to, and velocity of, an object relative to the optical proximity sensor. Wavelength modulation can be achieved by modulating a drive current supplied to the VCSEL.

One example wavelength modulation leverages a triangular waveform including an "up cycle" (in which current supplied to the VCSEL and, correspondingly, wavelength of the radiated beam emitted therefrom increase linearly at a particular rate) and a "down cycle" (in which current supplied to the VCSEL and wavelength of the radiated beam emitted therefrom decrease linearly at the same rate).

In this example, the undulation in wavelength can effectively simulate motion of the object toward and away from the optical proximity sensor, whether or not that object is actually moving. In these examples, frequency content of power output from the VCSEL (which can be obtained, in one example, by monitoring changes in current or voltage through or across a photodiode optically coupled to the VCSEL) affected by self-mixing interference effects can be described by Equation 1, presented below.

More specifically, in Equation 1, the quantity $f_t$ denotes a frequency at which power output from the VCSEL is modulated, at a particular time t, and as a function of a change in wavelength per unit time (which, in turn, is based on the rate of change in current supplied during the up cycle and down cycle of the triangular current waveform) multiplied by the round-trip distance $d_{rt}$ and divided by the wavelength at time t squared.

As may be appreciated, $f_t$ may also be increased or decreased as a result of Doppler effects. For example, if the object is moving toward the optical proximity sensor (e.g., parallel to the direction of propagation of the emitted beam), the frequency $f_t$ may be increased. Alternatively, if the object is moving away from the optical proximity sensor (e.g., parallel to the direction of propagation of the emitted beam), the frequency $f_t$ may be decreased. Equation 1 follows:

$$f_t = \frac{d\lambda}{dL} \cdot \frac{d_{rt}}{\lambda^2} \pm \frac{2v}{\lambda} \qquad \text{Equation 1}$$

In a more general form, the direction of motion of the object—or more particularly, the angle θ of motion of the object relative to the direction of propagation of the emitted beam—can also be considered. Equation 2, representing this more general form, follows:

$$f_t = \frac{d\lambda}{dL} \cdot \frac{d_{rt}}{\lambda^2} \pm \frac{2v}{\lambda}\cos(\theta) \qquad \text{Equation 2}$$

Using either Equation 1 or Equation 2, it may be appreciated that the distance to the object $$\frac{d_{rt}}{2}$$

and the velocity of that object v, can be readily determined by monitoring one or more characteristics of the frequency content of the power consumed by the VCSEL during the up cycle and down cycle of a triangular modulation waveform.

For simplicity of description the embodiments that follow reference an optical proximity sensor configured to leverage triangular waveform modulation to obtain both distance and velocity information from a VCSEL (or array of VCSELs, or other laser light source(s) such as edge-emitting laser light sources), although it may be appreciated that this is merely one example and that other constructions and modulation techniques may be used. In still further examples, an optical imaging system configured for a purpose other than proximity sensing can be used. Examples of such systems include, but are not limited to: a dot projection system; a focal length sensing system; an infrared flood illumination system; and so on.

Furthermore, it may be appreciated that any stationary or portable electronic device can incorporate an optical proximity sensor, such as described herein. Example electronic devices include, but are not limited to: mobile phone devices; tablet devices; laptop devices; desktop computers; computing accessories; peripheral input devices; home or business networking devices; aerial, marine, submarine, or terrestrial vehicle control devices or networking devices; mobile entertainment devices; augmented reality devices; virtual reality devices; industrial control devices; digital wallet devices; home or business security devices; wearable devices; head-mounted devices; hand-held controllers; health or medical devices; implantable devices; clothing-embedded devices; fashion accessory devices; home or industrial appliances; media appliances; and so on.

Similarly, an optical proximity sensor can be leveraged by an electronic device for a number of suitable purposes. Example purposes include, but are not limited to: detecting distance and velocity of a user's finger to an input surface or component of the electronic device; detecting distance and velocity of a user's body to an input surface or component of the electronic device; detecting deflection in an external surface of a housing of the electronic device due to a deformation caused by an application of force by a user; detecting an occlusion blocking or interfering with an operation of the camera module (e.g., fingerprints, debris, and so on); and the like.

Similarly, an optical proximity sensor, such as described herein, can include and/or may be optically coupled to any number of suitable optical adapters, lenses, or beam-shaping elements which may be internal to or external to a camera module, such as described herein. Examples include, but are not limited to: reflectors; mirrors; translucent lens windows; transparent lens windows; concave lenses; convex lenses; tilted lenses; microlenses; macro lenses; collimators; polarizers; color filters; infrared-cut filters; infrared-pass filters; fiber optic cables; and the like.

These foregoing and other embodiments are discussed below with reference to FIGS. 1-7. However, those skilled in the art will readily appreciate that the detailed description given herein with respect to these figures is for explanatory purposes only and should not be construed as limiting.

FIG. 1 depicts a schematic representation 100 of an electronic device 102 including a camera module integrating an optical proximity sensor 104. As with other embodiments described herein, the optical proximity sensor 104 is configured to measure a distance to an object 106 and/or a velocity of the object 106 relative to an optical proximity sensor 104 disposed within a housing of the electronic device 102.

The camera module of the electronic device 102 typically includes a protective component enclosure (or, more simply, an "enclosure"), potting, or encapsulation to prevent damage to parts and components thereof. The protective component enclosure of the camera module is typically affixed to an internal surface or structure within the housing of the electronic device 102, such as a frame.

The protective component enclosure of the camera module of the electronic device 102 includes a barrel portion extending a distance at least partially into and/or out from a body portion. The barrel typically has a rounded cross section although this is not required and other shapes may be suitable. The barrel encloses and protects a set of optical elements configured to cooperate to focus and/or stabilize an image onto a focal plane of an imaging sensor disposed within the body portion of the protective component enclosure of the camera module.

In some cases, the barrel of the camera module may extend through an aperture defined through the housing of the electronic device. In other cases, the barrel of the camera module may be disposed entirely within the housing, positioned below and aligned with an optically transparent window. The optically transparent window is typically formed from a durable and/or tough material such as glass or sapphire and may, in many examples, form at least a portion of a continuous exterior surface of the housing of the electronic device 102.

The barrel of the camera module typically includes a front element that protects and encloses one or more lens groups, optical image stabilization lenses, filters, apertures, and so on each of which may be disposed, in implementation-specific positions and order, above the image sensor of the camera module. In many cases, the barrel of the camera module and optical and mechanical components disposed therein are arranged specifically to reduce a distance separating the front element and the imaging sensor; such implementations are referred to herein as "compact camera modules" and may be suitable to include in a low-profile portable electronic device, such as a cellular phone, wearable electronic device, tablet computer, or laptop computer.

In many implementations, an infrared cut filter is positioned over the imaging sensor, below the barrel of the camera module, to prevent infrared light from interfering with imaging operations of the imaging sensor by reflecting substantially all infrared light away from the imaging sensor. In other cases, other optical filters can be used such as color filters, polarization filters, ultraviolet filters, and so on each type of which is specifically configured to be transparent to a first spectral range of light and to be reflective to a second spectral range of light.

In view of the foregoing, it may be appreciated that the example structure(s) and component set(s) of the camera module referenced above is not exhaustive. A camera module incorporated into an example electronic device, such as the electronic device 102, can include any number of suitable electrical, mechanical, optical, and structural components, the configuration(s), placement(s), and arrangement(s) of which may vary from embodiment to embodiment, implementation to implementation, and electronic device to electronic device.

Similarly, it may be appreciated that a camera module may be disposed relative to any suitable surface of an electronic device. Examples include: a camera module disposed relative to a perimeter or periphery of a display and/or user input surface; a camera module disposed relative to a rear surface of a housing opposite a display and/or user input surface; a camera module disposed relative to a sidewall or edge surface of an electronic device housing; a camera module disposed behind and/or within an active display area of a display and oriented to collect light incident to the display; and so on.

Accordingly, in view of the foregoing, it is appreciated that a camera module incorporating an optical sensing system—such as the optical proximity sensor 104 and other example implementations described herein—can be placed and configured relative to an electronic device or an electronic device housing in any number of suitable ways.

For example, the optical proximity sensor 104 of the electronic device 102 depicted in FIG. 1 can be entirely or partially integrated into the barrel of the camera module of the electronic device 102. For example, the optical proximity sensor 104 can include one or more VCSEL light sources oriented to emit laser light toward a reflective surface within the camera module.

More specifically, the VCSEL light sources of the optical proximity sensor 104 can be formed onto a substrate disposed onto (or into) an interior sidewall or shelf surface of the barrel of the camera module and can be configured to emit light within a spectral band that is reflected from the reflective surface. For example, if the reflective surface is an infrared cut filter, the VCSEL light sources of the optical proximity sensor 104 can be configured to emit infrared light.

The VCSEL light sources of the optical proximity sensor 104 can be formed from any number of suitable materials or combinations of materials. Similarly, the VCSEL light sources of the optical proximity sensor 104 can be formed in an suitable pattern or array. In one example embodiment, the VCSEL light sources of the optical proximity sensor 104 each include, without limitation or requirement: a first distributed Bragg reflector layer; an oxide layer defining an emission aperture; a quantum well layer; a second distributed Bragg reflector layer; and so on. In other examples, additional or fewer layers may be required.

As noted above, the VCSEL light sources of the optical proximity sensor 104 can be configured to emit beam(s) of infrared laser light toward the infrared cut filter of the camera module at an incidence angle such that at least a portion of the beams are reflected through the various lenses within the barrel and exit the camera module to propagate into free space. If an object is present to interrupt the propagation of the beams, some laser light will be reflected from an external surface of that object back toward the barrel of the camera module.

Thereafter, as noted above, at least a portion of the reflected infrared laser light reenters the barrel of the camera module, traverses the one or more lenses in the barrel, reflects from the infrared cut filter, and returns to the VCSEL light source from which it was emitted, inducing a self-mixing interference effect. The self-mixing interference effect, if any, can be characterized by monitoring (e.g., via a processor or circuit within, or external to, the camera module or the optical proximity sensor 104) current through or voltage across a photodiode optically coupled to the VCSEL light source. An output from the photodiode can, thereafter, be used to determine a measured distance, velocity, and/or acceleration of the object relative to the electronic device 102 that, in turn, can be communicated to the electronic device 102.

More specifically, the optical proximity sensor 104 can be configured to communicate distance and/or velocity information (which, as noted above, is calculated or otherwise determined based on observed self-mixing effects of at least one VCSEL light source), to a processor or system of the electronic device 102 in any suitable manner, according to any protocol, and/or in compliance with any suitable digital or analog form or format.

In response, the electronic device 102 may be configured to perform a function upon determining that the measured distance (and/or velocity, acceleration, and so on) has crossed one or more thresholds, such as distance thresholds or velocity thresholds. Such thresholds may be variable or fixed and may be set by, and/or stored within, a memory of the electronic device 102.

In some examples, the thresholds may be based on a user setting, an application setting, or an operating system setting or mode of operation. In other cases, such thresholds may be based, at least in part, on a particular application executed or instantiated by a processor of the electronic device 102. For example, a threshold set associated with a telephony application may be different from a threshold set associated with a gaming application. It may be appreciated that any suitable threshold or set of thresholds, stored or accessed in any suitable form or format may be used to inform one or more behaviors of the electronic device 102 in response to a signal received from the optical proximity sensor 104.

In another specific embodiment, the electronic device 102 can modify a display or power setting of the electronic device 102 based on the distance and velocity of the object (which may be a user of the electronic device 102). Examples include, but may not be limited to: decreasing a brightness of a display or a display region upon receiving a signal from the optical proximity sensor 104 that the user is covering the display; increasing a brightness of a display upon receiving a signal from the optical proximity sensor 104 that the display is uncovered; highlighting a user interface element (e.g., an item of a list, a button, and the like) of a graphical user interface upon receiving a signal from the optical proximity sensor 104 that the user is hovering a finger nearby the display; highlighting or otherwise modifying a user interface element of a graphical user interface upon receiving a signal from the optical proximity sensor 104 that the user is hovering a finger nearby an input component of the electronic device 102 (e.g., rotary input device, push-button input device, touch input device, and so on); and so on.

In another embodiment, the electronic device 102 may be a portable electronic device such as a cellular phone. In these examples, the electronic device 102 can leverage velocity or distance information received from the optical proximity sensor 104 integrated into the camera module to determine an appropriate time to disable or enable a touch-sensitive display of the electronic device 102 when a user of the electronic device raises or lowers the cellular phone relative to the user's ear. In other embodiments, the electronic device 100 can consume information from the optical proximity sensor 104 to inform an image or video capture operation of the camera module incorporating the optical proximity sensor 104 such as, but not limited to: an autofocus operation; a rangefinding operation; a field of view scanning operation; an optical image stabilization operation; an object tracking operation; a focus following operation; and so on or any combination thereof.

It may be appreciated that the foregoing example embodiments are not exhaustive and that an optical sensing system utilizing reflective surfaces within a camera module can be leveraged by an electronic device in any suitable manner. For example, in some embodiments, an electronic device or camera module can include more than one optical sensing system.

As such, it may be appreciated that the foregoing examples are not exhaustive and that generally and broadly a camera module including a reflective internal surface integrated one or more optical sensing systems, such as an optical proximity sensor, for any suitable purpose or function.

Figure 2A:
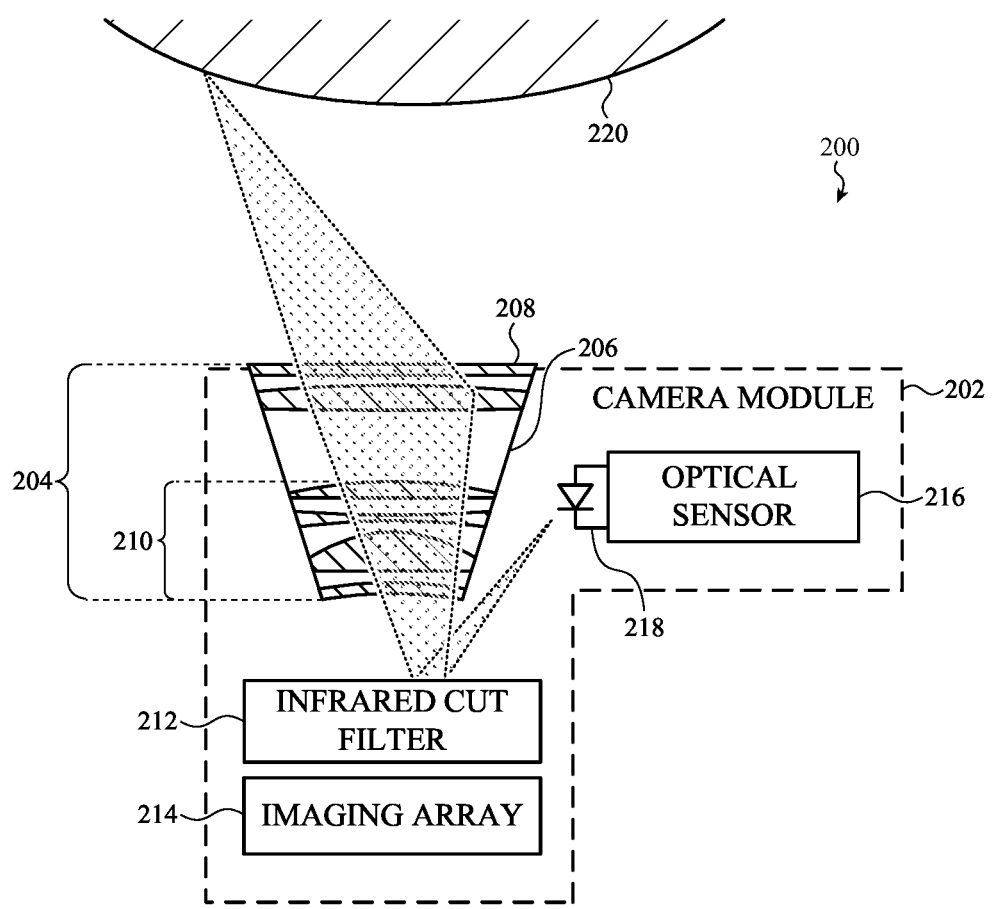
FIG. 2A depicts a system diagram of an optical sensing system integrated into a camera module of an electronic device, such as described herein.

FIG. 2A depicts a simplified system diagram and partial cross section 200 of a camera module 202 configured to integrate an optical sensing system that leverages a reflective property of a surface or element of the camera module 202.

In particular, the camera module 202 includes a barrel 204. The barrel 204 is characterized by a protective sidewall 206 that supports, encloses, and protects various optical components disposed therein. The protective sidewall 206 is typically manufactured into a shape that contours to, and interfaces with, a front element 208 and one or more fixed or movable lens groups 210. In many examples, the protective sidewall 206 has a circular cross section, and has the shape of a cylinder or frustum, but this may not be required of all embodiments.

The front element 208 can be adhered, sealed, and/or friction fit onto or into the protective sidewall 206. In some cases, the protective sidewall 206 defines an internal shelf to support the front element 208. In other cases, the front element 208 and the protective sidewall 206 can be co-molded or otherwise manufactured together. The front element 208 is typically manufactured from a transparent material, such as glass, plastic, or sapphire.

As with the front element 208, the one or more fixed or movable lens groups 210 can be adhered, sealed, and/or friction fit onto or into the protective sidewall 206. In some cases, the protective sidewall 206 defines a set of internal shelves to support the one or more fixed or movable lens groups 210. In other cases, the one or more fixed or movable lens groups 210 and the protective sidewall 206 can be co-molded or otherwise manufactured together. As with the front element 208, the one or more fixed or movable lens groups 210 is typically manufactured from a transparent material, such as glass, plastic, or sapphire. The one or more fixed or movable lens groups 210 can have any suitable cross section and may be configured to, without limitation: diverge a beam of light; focus a beam of light; diffuse/diffract a beam of light; filter a beam of light; redirect a beam of light; provide optical image stabilization functions; and so on.

The barrel 204 of the camera module 202 is positioned above a spectral filter configured to transmit light in a particular spectral range and to reflect light in another spectral range. As one example in the illustrated embodiment, the spectra filter may be an infrared cut filter, such as the infrared cut filter 212 which is positioned above an imaging sensor 214. As with other embodiments described herein, the infrared cut filter 212 can be configured to be transparent to visible light and to reflect infrared light.

Figure 2B:
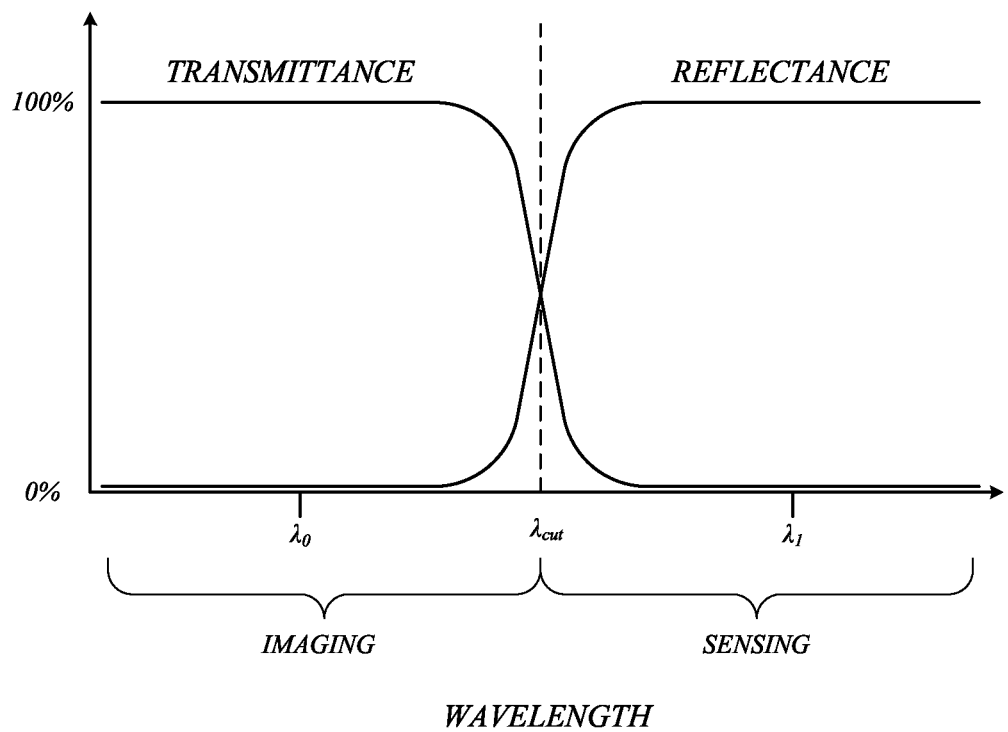
FIG. 2B is a simplified graphic representation of optical characteristics of a spectral filter of the camera module of FIG. 2A.

For example, as shown in FIG. 2B, the infrared cut filter 212 can be configured to be substantially transparent (e.g., near 100% transmittance) to wavelengths of light in a first range of wavelengths (e.g., "band") of light, which is a visible band of light. Phrased in another, non-limiting manner, the infrared cut filter 212 can be configured to be substantially reflective (e.g., near 100% reflectance) to wavelengths of light outside of the first band, in a second band of light including infrared light. In this manner, visible light at a first wavelength $\lambda_0$ traverses through the infrared cut filter 212, whereas infrared light at a second wavelength $\lambda_1$ reflects from a top surface (see, e.g., FIG. 2C) of the infrared cut filter 212 and/or from a bottom surface of the infrared cut filter 212.

Figure 2C:
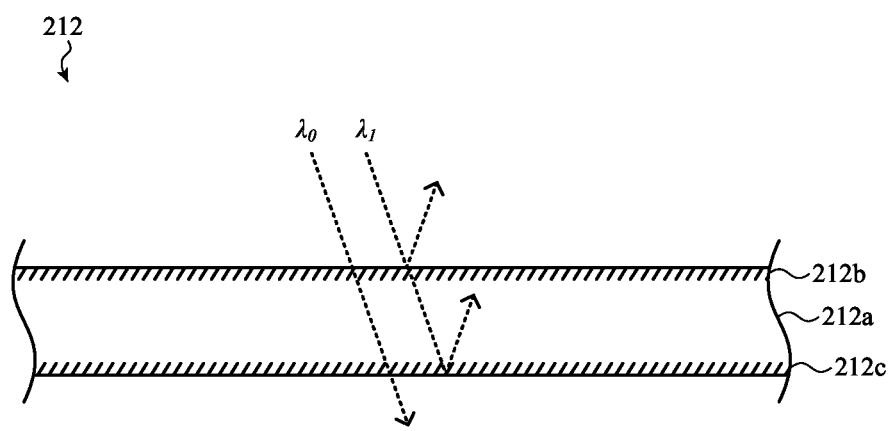
FIG. 2C is a simplified cross-section of the spectral filter of the camera module of FIG. 2A.

FIG. 2C depicts an example simplified cross-section through a substrate 212a defining the infrared cut filter 212. In particular, FIG. 2C depicts an infrared-reflective coating disposed onto a top surface 212b 212c of the substrate 212a and (optionally; additionally or alternatively) an infrared-reflective coating disposed into a bottom surface 212c of the substrate 212a. The infrared-reflective coating on the top surface 212b can be the same or different from the infrared-reflective on the bottom surface 212b. In some cases, only one coating may be required or preferred. In some cases, the infrared-reflective coating(s) may be configured to reflect and/or absorb different bands or spectral ranges of infrared or other light.

The infrared cut filter 212 can be manufactured in any suitable manner. In one example, the infrared cut filter 212 is implemented by disposing an infrared-reflective material onto a thin, transparent substrate. In these embodiments, and with reference back to FIG. 2A, the infrared-reflective material can be disposed on a side of the substrate interfacing the imaging sensor 214 or, alternatively, on a side of the substrate interfacing the barrel 204. In other cases, a layer of infrared-reflective material may be sandwiched between two transparent substrates within the camera module 202. It may be appreciated that these examples are not exhaustive.

As with other embodiments described herein, the camera module 202 includes an optical sensing system, identified as the optical sensor 216. In one embodiment, the optical sensor 216 is an optical proximity sensor, such as described above. In the illustrated embodiment, the optical sensor 216 is disposed alongside the barrel 204, although it may be appreciated that this arrangement is merely one example.

In some embodiments, the optical sensor 216 includes a light-emitting element 218 configured to emit infrared light toward the infrared cut filter 212. As a result of the optical properties that the infrared cut filter 212 is designed to exhibit, infrared light emitted from the light-emitting element 218 of the optical sensor 216 reflects off the infrared cut filter 212. As a result of placement of the optical sensor 216 and/or the light-emitting element 218, light emitted from the light-emitting element 218 is incident to the infrared cut filter 212 at an angle such that at least a portion of that light enters the barrel 204, traverses the one or more fixed or movable lens groups 210, and exits the camera module through the front element 208 to propagate into free space.

In some cases, as noted above, an object 220 (which may be a user of an electronic device incorporating the camera module 202) can interrupt the propagation of infrared light emitted from the optical sensor 216, causing at least a portion of that light to reflect back toward the optical sensor 216 along substantially the same optical path traversed by the light emitted from the optical sensor 216. In these embodiments, as noted above, reflections from the object 220 can induce self-mixing interference effects in the light-emitting element 218 that can be observed and/or quantified by a processor or circuit internal or external to the camera module 202 and/or the optical sensor 216. For example, as noted with respect to other embodiments described herein, the optical sensor 216 can include a photodiode optically coupled to the light-emitting element 218. By monitoring one or more electrical characteristics of the photodiode (e.g., current, voltage, and so on), one or more properties of self-mixing interference effect(s)—if any—experienced by the light-emitting element 218 can be quantified and there-after correlated to a measured distance, velocity, and/or acceleration (with one or more directional components) such as described above.

The foregoing embodiments depicted in FIGS. 2A-2C and the various alternatives thereof and variations thereto are presented, generally, for purposes of explanation, and to facilitate an understanding of various configurations and constructions of an optical sensing system or optical sensor integrated into a camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Generally and broadly, FIGS. 3A-3D example cross sections of a camera module that can incorporate an optical sensing system, such as described herein. For simplicity of illustration and description, these embodiments reference a camera module that integrates an optical proximity sensor configured to determine a distance to an object nearby the camera module. the optical proximity sensor, as with other embodiments described herein, includes a VCSEL light source configured to emit infrared light and a photodiode optically coupled to the VCSEL light source. The optical proximity sensors of these embodiments is, or can be, coupled to and/or placed in communication with a circuit or combination of circuits configured to apply a driving voltage or current signal to the VCSEL light source to cause the VCSEL light source to emit infrared light at a particular selected modulation. Additionally, the optical proximity sensors of these embodiments is, or can be, coupled to and/or placed in communication with a circuit or combination of circuits configured to monitor one or more electrical properties of the photodiode (e.g., voltage, current, and so on) to determine whether the VCSEL light source is experiencing a self-mixing effect.

More specifically, the depicted optical proximity sensors of these embodiments can include, and/or can be coupled to a processor, a memory, and a power controller. In these examples, it is appreciated that a processor, a memory, and/or a power controller associated with an optical proximity sensor, such as described herein, may be interconnected and/or communicably or conductively coupled in any suitable manner. As described herein, the term "processor" refers to any software and/or hardware-implemented data processing device or circuit physically and/or structurally configured to instantiate one or more classes or objects that are purpose-configured to perform specific transformations of data or input including operations represented as code and/or instructions included in a program that can be stored within, and accessed from, a memory. This term is meant to encompass a single processor or processing unit, multiple processors, multiple processing units, analog or digital circuits, application-specific integrated circuits, or other suitably configured computing element or combination of elements.

For simplicity of illustration, FIGS. 3A-3F are depicted without many of these elements, each of which may be included, partially and/or entirely, within a component enclosure or housing associated with the optical proximity sensor(s) (and/or camera modules incorporating the same) and may be operationally or functionally associated with, or coupled to, any suitable circuit and power source or supply of the electronic device.

Figure 3A:
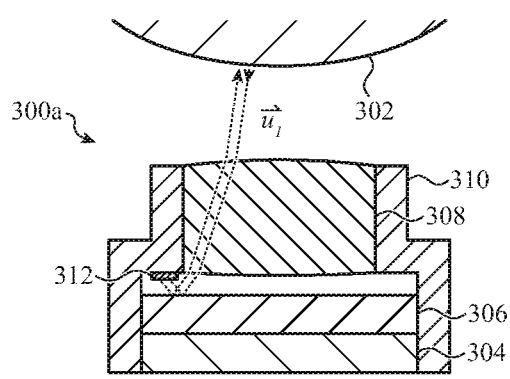
FIG. 3A depicts a simplified cross section of a camera module incorporating an optical sensing system, such as described herein.

For example, FIG. 3A depicts a partial cross section of a camera module 300a that can incorporate an optical proximity sensor (and/or sensing elements thereof) configured to measure a distance to and/or a velocity of an object 302 nearby the camera module 300a. As with other embodiments described herein, the camera module 300a includes an imaging sensor 304 disposed below an infrared cut filter 306. The imaging sensor 304 and the infrared cut filter 306 are disposed below a lens group 308 that is supported by a barrel 310. In this embodiment, a VCSEL light source 312 of the optical proximity sensor can be coupled to an internal surface of the barrel 310. In the illustrated embodiment, the VCSEL light source 312 is disposed on a flange portion of an internal surface of the barrel 310 and is oriented such that a beam of laser light $u_1$ emitted from the VCSEL light source 312 reflects from an upper surface of the infrared cut filter 306, traverses the lens group 308, and exits the camera module 300a to propagate through free space until being interrupted by the object 302. The VCSEL light source 312 can be disposed in any orientation, angle, or position. In some embodiments, the VCSEL light source 312 is installed at a particular angle or in a particular position that enables an optical image stabilization lens or system to steer light toward or away from the VCSEL light source 312.

As with other embodiments described herein, once the beam of laser light $u_1$ reflects from an external surface of the object 302, at least a portion of that laser light can return to the VCSEL light source 312 (by reflecting at least once off the infrared cut filter 306) to induce a self-mixing interference effect that can be quantified by monitoring output from a photodiode optically coupled to the VCSEL light source 312.

Figure 3B:
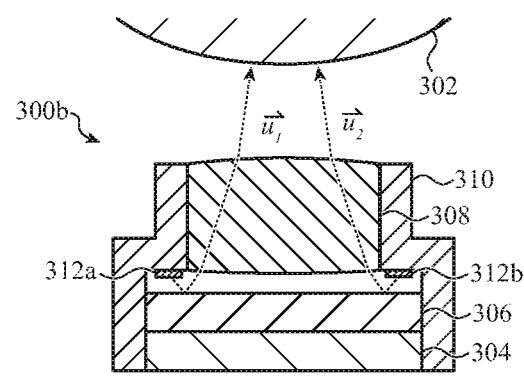
FIG. 3B depicts a simplified cross section of another camera module incorporating an optical sensing system, such as described herein.

It may be appreciated that the configuration depicted in FIG. 3A is merely one example. In other cases, more than one VCSEL light source can be disposed on one or more internal surfaces of the barrel. FIG. 3B depicts an example cross section of a camera module 300b. It is appreciated that the camera module 300b can be configured in the same manner as the camera module 300a depicted in FIG. 3A and described with reference thereto; this description is not repeated and like elements are similarly numbered. For simplicity of illustration, a reflection of light from the object 302 is not depicted; it may be appreciated that the object 302 may reflect light emitted by the VCSEL light source.

In FIG. 3B, the camera module 300b includes more than one VCSEL light source, disposed in different locations of the interior surface of the barrel 310. More specifically, a first VCSEL light source 312a is disposed on an opposite side of the barrel 310 from a second VCSEL light source 312b. The first and second VCSEL light sources can be associated with, and/or communicably or operationally coupled to, the same optical proximity sensor. In other cases, each of the first and second VCSEL light sources are associated with different optical sensing systems to, without limitation, cover a wider field of view, different depths or ranges of interest, for vectorized ranging, to provide a velocity mapping of objects within the field of view of the camera module, for redundancy (e.g., ranging remains possible despite occlusion of one or more of the VCSEL light source(s)), to detect specific materials or surfaces reflective to different wavelengths or light, and so on.

Figure 3C:
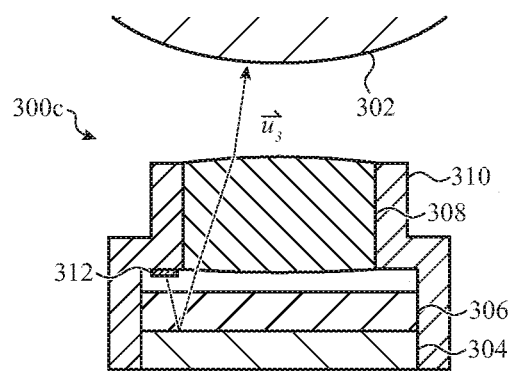
FIG. 3C depicts a simplified cross section of another camera module incorporating an optical sensing system, such as described herein.

In further examples, beams of light emitted from VCSEL light sources may be configured to reflect off a surface different than depicted in FIGS. 3A-3B. For example, in FIG. 3C depicts a camera module 300c in which a beam of laser light $u_3$ reflects from a lower surface of the infrared cut filter 306. As with FIG. 3B, it is appreciated that the camera module 300c can be configured in the same manner as the camera module 300a depicted in FIG. 3A and described with reference thereto; this description is not repeated and like elements are similarly numbered. In this embodiment, or others related thereto, the VCSEL light source can be disposed on a wedge spacer that, in turn, is disposed onto an outer surface of the infrared cut filter 306. In other cases, the VCSEL light source can be disposed in a position and/or at an angle to leverage beam steering provided by one or more movable optical elements (e.g., optical image stabilization elements) within the camera module 300c.

Figure 3D:
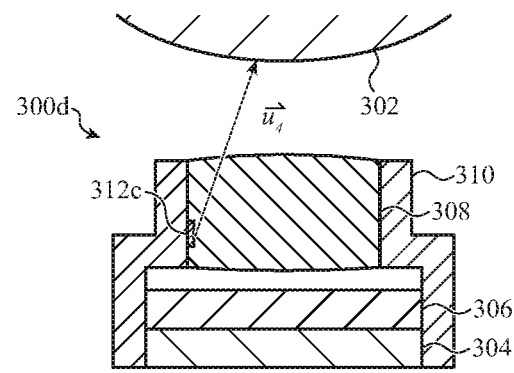
FIG. 3D depicts a simplified cross section of another camera module incorporating an optical sensing system, such as described herein.

In still further examples, an optical proximity sensor may not be required to reflect an infrared beam of light off the infrared cut filter. For example, FIG. 3D depicts a camera module 300d in which a beam of laser light $u_4$ is emitted from a VCSEL light source 312c that is disposed on a sidewall of the barrel 310.

Figure 3E:
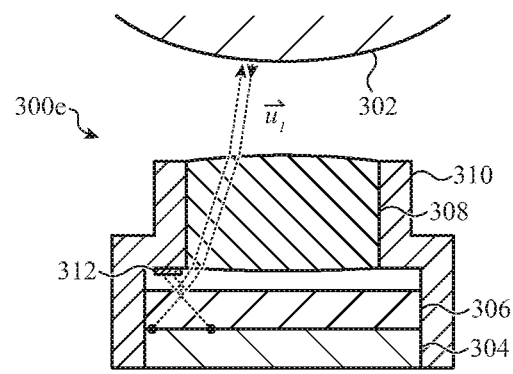
FIG. 3E depicts a simplified cross section of another camera module incorporating an optical sensing system, such as described herein.

In still further embodiments, an infrared cut filter—or, more generally, a spectral filter—may not necessarily reflect all light emitted from a VCSEL light source or reflected from an object, such as the object 302. For example, as shown in FIG. 3E, the spectral filter 306 of the camera module 300e may allow a certain quantity of light emitted from the VCSEL light source 312 to pass through the spectral filter 306 and to be received and/or absorbed by the imaging sensor 304. In these embodiments, one or more optical image sensors (e.g., pixels, photosensitive areas, and so on) of the imaging sensor 304 can be used to monitor power output from the VCSEL light source 312 and/or one or more characteristics of light reflected by the object 302. In this manner, the imaging sensor 304 can cooperate with and/or take the place of a photodiode such as described above.

Figure 3F:
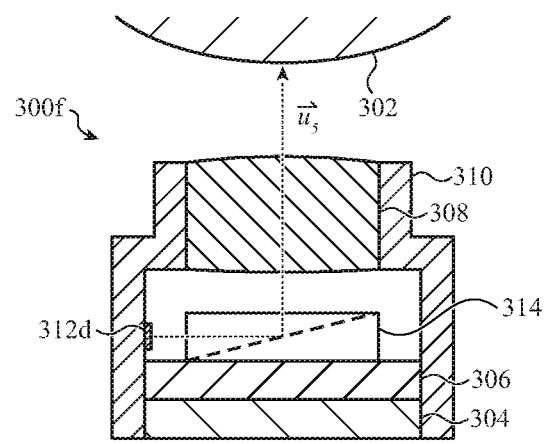
FIG. 3F depicts a simplified cross section of another camera module incorporating an optical sensing system, such as described herein.

In other embodiments, a camera module can include a beam splitter and/or an angled reflector as a dedicated element. For example, as shown in FIG. 3F, an angled reflector 314 can be disposed above the imaging sensor 304 and the infrared cut filter 306. The angled reflector 314 can be positioned in order to reflect light toward and away from the VCSEL light source 312d, which may be disposed on a sidewall of the barrel 310. The angled reflector 314 can be manufactured from any number of suitable materials and/or may be configured to reflect or transmit any suitable spectral range of light. In some embodiments, the angled reflector 314 includes an infrared reflection filter, although this may not be required of all embodiments.

The foregoing embodiment depicted in FIGS. 3A-3F and the various alternatives thereof and variations thereto are presented, generally, for purposes of explanation, and to facilitate an understanding of various possible means by which an optical proximity sensor, such as described herein, can be incorporated entirely or partly within a camera module. However, it will be apparent to one skilled in the art that some of the specific details presented herein may not be required in order to practice a particular described embodiment, or an equivalent thereof.

For example, it may be appreciated that an optical proximity sensor integrated into a camera module—such as described herein—can be configured in a number of suitable ways. More specifically, it may be appreciated that a VCSEL light source and a photodiode of an optical proximity sensor, such as described herein can be arranged in a number of suitable ways.

Figure 4A:
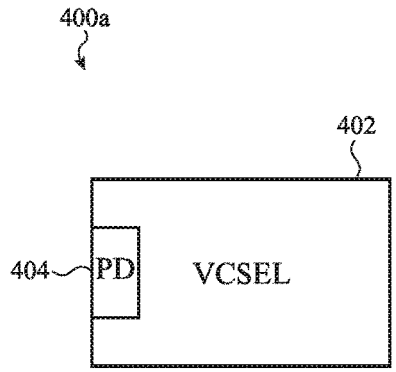
FIGS. 4A-4D depict simplified cross sections of example optical sensing systems configured for self-mixing, each including a laser module and a photodiode, such as described herein.
Figure 4B:
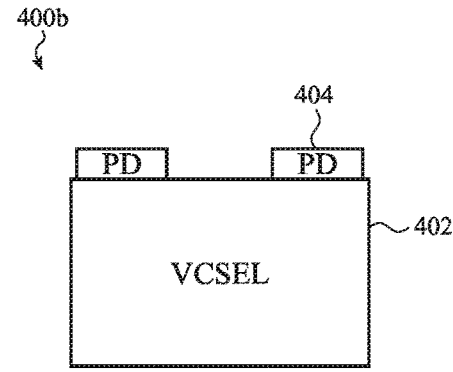
Figure 4C:
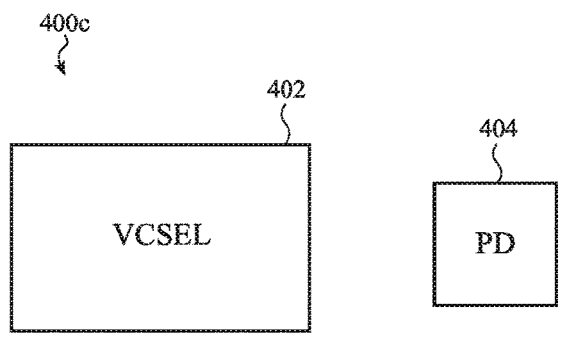
Figure 4D:
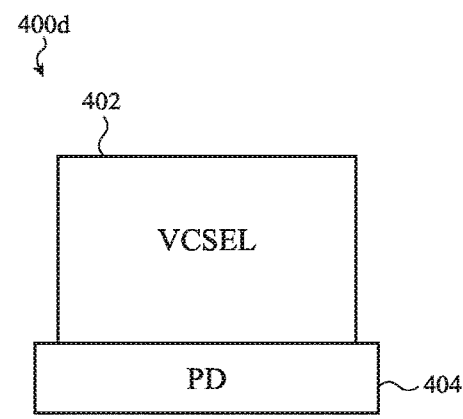

Generally and broadly, FIGS. 4A-4D example cross sections and arrangements of a VCSEL light source and photodiode of an optical proximity sensor, such as described herein. For example, as shown in FIG. 4A, an optical proximity sensory 400a includes a VCSEL light source 402 that is manufactured with a photodiode 404 on the same die. In another example depicted in FIG. 4B, an optical proximity sensory 400b includes a photodiode 404 disposed as a ring positioned on a top surface of a VCSEL light source 402. In yet another example depicted in FIG. 4C, an optical proximity sensory 400c includes a VCSEL light source 402 and a photodiode 404 are separate and discrete elements. In yet another example depicted in FIG. 4D, an optical proximity sensory 400d includes a VCSEL light source 402 positioned above a photodiode 404.

The foregoing embodiment depicted in FIGS. 4A-4D and the various alternatives thereof and variations thereto are presented, generally, for purposes of explanation, and to facilitate an understanding of various possible means by which a VCSEL light source and a photodiode of an optical proximity sensor, such as described herein, can be arranged relative to one another. However, it will be apparent to one skilled in the art that some of the specific details presented herein may not be required in order to practice a particular described embodiment, or an equivalent thereof.

As such, and as with other embodiments described herein, it is understood that the foregoing descriptions of specific embodiments of an optical sensing system are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
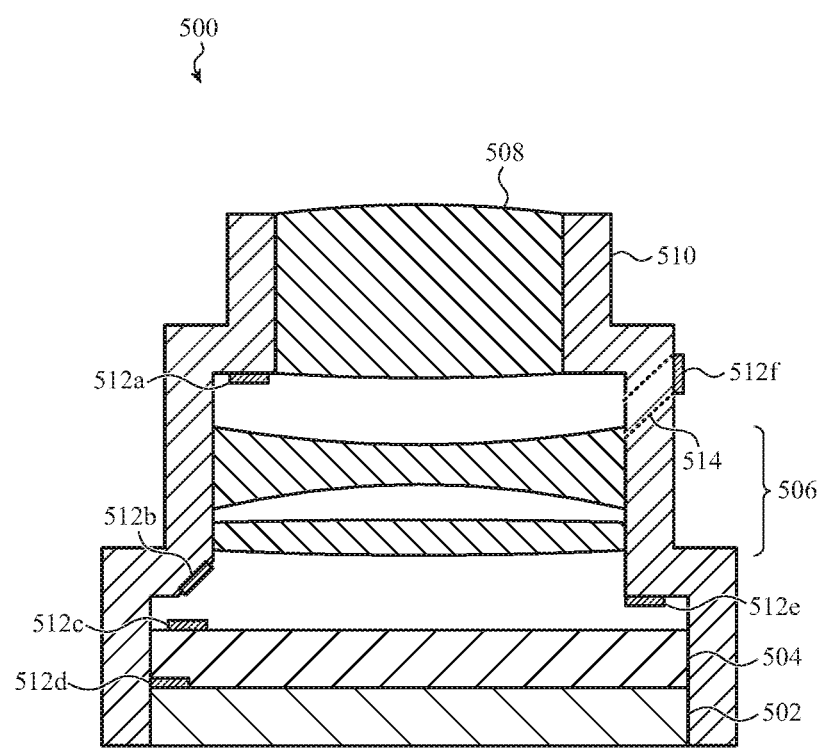
FIG. 5 depicts another simplified cross section of a camera module and lens barrel incorporating an optical sensing system in one or more locations, such as described herein.

FIG. 5 depicts another simplified cross section of a camera module incorporating an optical sensing system, such as described herein. As with other embodiments described herein, the camera module 500 includes an imaging sensor 502 and an infrared cut filter 504. The imaging sensor 502 and the infrared cut filter 504, as with other embodiments described above, are disposed below one or more lens elements or groups of elements, such as the lens groups 506, 508. The lens groups 506 can be any suitable movable (e.g., optical image stabilization) or stationary lenses or other optical elements.

The camera module 500 also includes a component enclosure 510 to enclose, protect, and support components and elements thereof. The component enclosure 510 includes a body portion 510a into which the imaging sensor 502 and the infrared cut filter 504 are disposed. The component enclosure 510 also includes a barrel section extending from the body portion 510b into which the lens groups 506, 508 are disposed. Each of the lens groups 506, 508 may include one or more of, without limitation: a front element; a concave lens; a convex lens; an aspheric lens; a polarizer layer; a color filter layer; and so on.

As with other embodiments described herein, an optical sensing system can be incorporated in whole or in part into the camera module 502. The optical sensing system can include an a light sensitive element (e.g., photodiode) and/or a light-emitting element (e.g. VCSEL light source) disposed within the component enclosure 510. More specifically, a light sensitive element and/or a light-emitting element of the optical sensing system can be disposed and/or formed onto an interior sidewall or other surface of the body portion of the component enclosure 510 or the barrel portion of the component enclosure 510. Various example positions of an optical element 512 are depicted in FIG. 5, and are identified as the optical elements 512a-512f.

A suitable example location of an optical sensing element (e.g., either or both light sensing or light emitting) is shown with the optical element 512a. The optical element 512a of the optical sensing system in the illustrated embodiment is disposed on a lower surface of a shelf region of the body portion of the component enclosure 510 between the lens group 506 and the lens group 508. The optical element 512a is oriented substantially parallel (and, optionally, including beam-steering optics such as microlenses, optical wedges, fiber optics and so on) to the imaging sensor 502 and the infrared cut filter 504. As a result of this construction, an infrared optical path is defined between the optical element 512a and free space via a reflection from an upper or lower surface of the infrared cut filter 504.

Another suitable example location of an optical sensing element (e.g., either or both light sensing or light emitting) is shown with the optical element 512b. The optical element 512a of the optical sensing system in the illustrated embodiment is disposed on an angled or beveled internal surface of a shelf region of the body portion of the component enclosure 510 below the lens groups 506, 508. In contrast with the optical element 512a, the optical element 512b is angled relative to the imaging sensor 502 and the infrared cut filter 504. As a result of this construction, an infrared optical path can be defined between the optical element 512b and free space via a reflection from the upper or lower surface of the infrared cut filter 504.

Another suitable example location of an optical sensing element (e.g., either or both light sensing or light emitting) is shown with the optical element 512c. The optical element 512c of the optical sensing system in the illustrated embodiment is disposed onto an external surface of the infrared cut filter 504 (e.g., with an optical wedge or other beam steering optics). As a result of this construction, an infrared optical path can be defined between the optical element 512c and free space via a reflection from a lower surface of the infrared cut filter 504.

Yet another suitable example location of an optical sensing element (e.g., either or both light sensing or light emitting) is shown with the optical element 512d. The optical element 512d of the optical sensing system in the illustrated embodiment is disposed onto an external of the imaging sensor 502 itself. As a result of this construction, an angled visible light optical path can be defined between the optical element 512d and free space directly through the lens groups 506, 508; reflection from a reflective surface within the component enclosure 510 is not required.

Another suitable example location of an optical sensing element (e.g., either or both light sensing or light emitting) is shown with the optical element 512e. Similar to the optical element 512a, the optical element 512e of the optical sensing system in the illustrated embodiment is disposed on a lower surface of another shelf region of the body portion of the component enclosure 510 between the infrared cut filter 504 and the lens group 508. As a result of this construction, an infrared optical path can be defined between the optical element 512e and free space via a reflection from a lower or upper surface of the infrared cut filter 504.

Yet another suitable example location of an optical sensing element (e.g., either or both light sensing or light emitting) is shown with the optical element 512f. The optical element 512f of the optical sensing system in the illustrated embodiment is disposed on an exterior surface of the body portion of the component enclosure 510. In order to optically couple to the interior of the body portion of the component enclosure 510, the optical element 512*f* can be positioned adjacent to an aperture or optical waveguide 514. As a result of this construction, an infrared optical path can be defined between the optical element 512*f*, the optical waveguide 514, and free space via a reflection from a lower surface of the infrared cut filter 504.

The foregoing embodiment depicted in FIG. 5 and the various alternatives thereof and variations thereto are presented, generally, for purposes of explanation, and to facilitate an understanding of various possible positioned of an optical element, such as a light-emitting element or a light sensing element, can be positioned within a camera module such as described herein. However, it will be apparent to one skilled in the art that some of the specific details presented herein may not be required in order to practice a particular described embodiment, or an equivalent thereof.

For example, in some embodiments, an optical sensing system integrated into a camera module can include a light-emitting element and a light sensitive element. For example, an optical sensing system can be communicably and/or operably coupled to the optical element 512*a* and the optical element 512*e*.

In other cases, an optical sensing system can leverage one or more movable lenses within a camera module to focus, diverge, or redirect light emitted from an optical element and/or received by an optical element. For example, in some embodiments, a camera module includes a movable lens associated with an optical image stabilization system or an autofocus system. In this example, the movable lens can be used to direct and/or otherwise focus a beam of infrared laser light to a particular direction and/or along a particular path in free space.

In addition, generally and broadly it may be appreciated that an optical sensing system integrated into a camera module and (optionally) leveraging a reflective surface within that camera module can be used by an electronic device and/or the camera module for any number of suitable purposes. Examples include, without limitation: an infrared optical proximity sensor integrated into a front-facing camera module of a smart phone and configured to reflect from an infrared cut filter of the front-facing camera can be used as an ambient light sensor and/or a user proximity sensor; an infrared optical proximity sensor integrated into a camera module can be used by the camera module to identify whether an exterior lens is smudged or otherwise dirty and in need of cleaning; an infrared projector integrated into a front-facing camera module of a smart phone can be used as with an active biometric identification system; and so on.

As such, and as with other embodiments described herein, it is understood that the foregoing descriptions of specific embodiments of an optical sensing system are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 6:
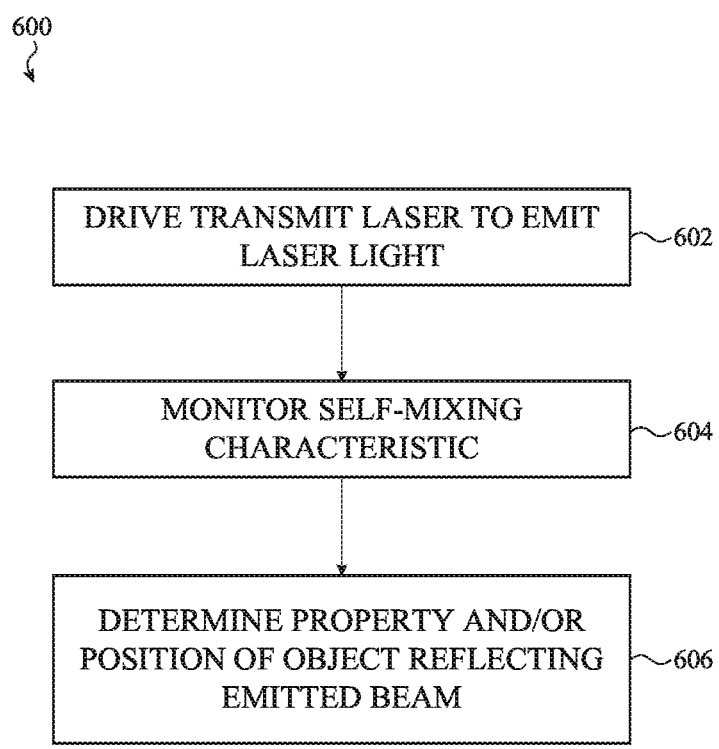
FIG. 6 is a flowchart depicting example operations of a method of operating a proximity sensor, such as described herein.

FIG. 6 is a flowchart depicting example operations of a method of operating a proximity sensor, such as described herein. The method 600 can be performed in whole or in part by a processor, controller, or any suitable circuit or circuitry of a camera module, optical proximity sensor, or electronic device such as described herein. In particular, the method 600 includes operation 602 in which a drive signal is applied to a VCSEL light source integrated into a camera module. Next, at operation 604, a self-mixing interference characteristic of the VCSEL light source is monitored (e.g., by a photodiode optically coupled to the VCSEL light source). Finally, at operation 606, one or more properties of an object interrupting and/or reflecting the beam of laser light emitted at operation 602 can be determined based on one or more self-mixing characteristics determined at operation 604.

Figure 7:
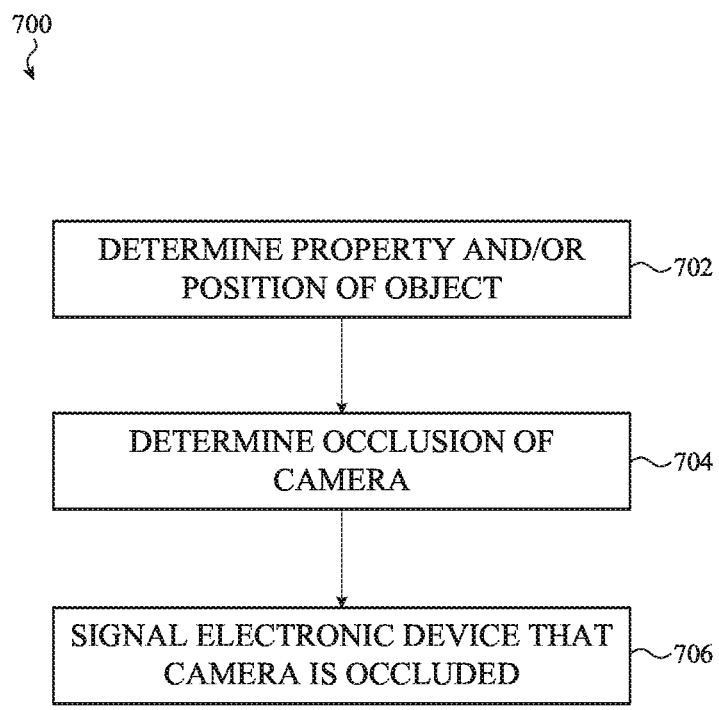
FIG. 7 is a flowchart depicting example operations of a method of operating a proximity sensor with a camera module, such as described herein.

FIG. 7 is a flowchart depicting example operations of a method of operating a proximity sensor with a camera module within an electronic device, such as described herein. As with the method 600, the method 700 can be performed in whole or in part by a processor, controller, or any suitable circuit or circuitry of a camera module, optical proximity sensor, or electronic device such as described herein. The method 700 includes operation 702 in which a property (e.g., velocity or acceleration) and/or a position of an object nearby an electronic device is determined by an optical proximity sensor, such as described herein. Next, at operation 704, the optical proximity sensor can determine that the camera module is obstructed. This operation can be performed by comparing a measured distance to a detected object to a threshold; if the measured distance is fixed for a period of time and, additionally or alternatively, is determined to be close to the camera module (e.g., in contact with an external surface of the camera module), operation 704 can advance to operation 706 in which a signal is provided to the electronic device. Thereafter, the electronic device can perform an operation to notify the user of a detect an occlusion or an obstruction over the camera module.

One may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but are instead defined by the claims herein presented.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An electronic device comprising:
    a housing;
    a camera module disposed within the housing and comprising:
        a barrel defining an exterior surface and an interior surface;
        a lens group within the barrel and coupled to at least a portion of the interior surface; and
        an image sensor positioned below the lens group; and
    an infrared laser element positioned on the exterior surface of the barrel and oriented to emit infrared laser light into the barrel along an optical path intersecting at least one lens of the lens group and exits the barrel.

2. The electronic device of claim 1, wherein the infrared laser is a vertical cavity surface-emitting laser.

3. The electronic device of claim 1, wherein the infrared laser comprises a photodiode configured to monitor power output from the infrared laser.

4. The electronic device of claim 1, comprising a display, wherein the camera module is disposed within an active display area of the display.

5. The electronic device of claim 4, wherein the camera extends through a circular aperture defined through the active display area of the display.

6. The electronic device of claim 1, wherein the camera module comprise an infrared filter positioned over the image sensor.

7. The electronic device of claim 6, wherein the infrared laser is oriented to emit infrared laser light toward the infrared filter.

8. The electronic device of claim 6, wherein the infrared filter is an infrared cut filter.

9. A camera module for a portable electronic device, the camera module comprising:
    a module enclosure configured to be disposed within a housing of the portable electronic device, the module enclosure formed from a material opaque to visible light;
    a filter element within the module enclosure;
    an image sensor below the filter element and disposed within the module enclosure;
    an infrared laser light source disposed on an exterior surface of the module enclosure and oriented to emit light through a sidewall of the module enclosure toward the filter element so as to reflect from the filter element and exit the module enclosure.

10. The camera module of claim 9, wherein the filter is an infrared cut filter.

11. The camera module of claim 9, wherein the infrared laser light source is configured to emit laser light through the module enclosure.

12. The camera module of claim 9, wherein the infrared laser light source is configured to emit laser light through an aperture defined through a sidewall of the module enclosure.

13. The camera module of claim 9, wherein the module enclosure defines a barrel and the infrared laser light source is coupled to an exterior sidewall of the barrel.

14. An electronic device comprising:
    a housing;
    a display within the housing and defining an active display area, the active display area having a circular aperture defined therethrough;
    a camera module disposed within the housing and aligned with the circular aperture, the camera module comprising:
        a module enclosure defining a barrel having an internal volume, a central axis of the barrel aligned with the circular aperture;
        a lens group aligned with the central axis of the barrel and within the internal volume of the module enclosure;
        an infrared cut filter aligned with the central axis of the barrel; and
        an imaging sensor within the module enclosure and aligned with the infrared cut filter; and
    a proximity sensor comprising a laser light source, the laser light source disposed within the housing and oriented to emit light through the module enclosure to the internal volume of the module enclosure.

15. The electronic device of claim 14, wherein the laser light source is configured to emit infrared light toward the infrared cut filter.

16. The electronic device of claim 14, wherein the laser light source comprises a vertical cavity surface emitting laser disposed on an external sidewall surface of the module enclosure.

17. The electronic device of claim 14, wherein the laser light source is configured to emit light through an aperture defined through an external sidewall surface of the module enclosure.

18. The electronic device of claim 14, wherein the infrared cut filter is configured to reflect infrared light.

19. The electronic device of claim 14, wherein the proximity sensor is an interferometric sensor.

20. The electronic device of claim 14, wherein the module enclosure is formed at least in part from a material optically opaque to visible light.

* * * * *